(12) United States Patent
Vandendriessche

(10) Patent No.: US 9,956,907 B2
(45) Date of Patent: May 1, 2018

(54) CONTROLLER FOR A VEHICLE

(71) Applicant: CNH Industrial America LLC, New Holland, PA (US)

(72) Inventor: Jean-Pierre Vandendriessche, Erpe-Mere (BE)

(73) Assignee: CNH Industrial America LLC, New Holland, PA (US)

( * ) Notice: Subject to any disclaimer, the term of this patent is extended or adjusted under 35 U.S.C. 154(b) by 24 days.

(21) Appl. No.: 14/844,730

(22) Filed: Sep. 3, 2015

(65) Prior Publication Data
US 2016/0059779 A1    Mar. 3, 2016

(30) Foreign Application Priority Data

Sep. 3, 2014    (BE) .................................. 2014/0664

(51) Int. Cl.
| | | |
|---|---|---|
| *B60Q 9/00* | (2006.01) | |
| *B62D 55/00* | (2006.01) | |
| *B60C 23/04* | (2006.01) | |
| *B60C 23/20* | (2006.01) | |
| *B62D 55/14* | (2006.01) | |
| *B60C 23/06* | (2006.01) | |

(52) U.S. Cl.
CPC ............ *B60Q 9/00* (2013.01); *B60C 23/0408* (2013.01); *B62D 55/00* (2013.01); *B60C 23/06* (2013.01); *B60C 23/20* (2013.01); *B62D 55/14* (2013.01)

(58) Field of Classification Search
CPC ..... B60C 23/0408; B60C 23/20; B60C 23/06; B62D 55/14; G01K 13/08; B62E 55/00

USPC ............................................................ 701/50
See application file for complete search history.

(56) References Cited

U.S. PATENT DOCUMENTS

| | | | |
|---|---|---|---|
| 3,311,424 A | 3/1967 | Taylor | |
| 3,879,594 A | 4/1975 | Shillito | |
| 5,071,259 A | 12/1991 | Metzger et al. | |
| 6,386,653 B1 | 5/2002 | Brandenburger | |
| 7,760,080 B2 * | 7/2010 | Breed | B60C 23/0408 340/444 |
| 9,033,431 B1 * | 5/2015 | Zuchoski | B62D 55/14 305/130 |
| 2004/0130442 A1 * | 7/2004 | Breed | B60C 11/24 340/443 |

(Continued)

FOREIGN PATENT DOCUMENTS

| | | |
|---|---|---|
| EP | 1676878 A1 | 7/2006 |
| JP | 2004340786 A | 12/2004 |

(Continued)

*Primary Examiner* — Jason Holloway
(74) *Attorney, Agent, or Firm* — Patrick M Sheldrake

(57) ABSTRACT

A controller for a vehicle having a continuous track for vehicle propulsion. The controller is programmed to: process (i) a speed value indicative of a speed at which the vehicle is being driven; and (ii) a time value indicative of a period of time for which the vehicle has been driven at that speed; determine an overheating parameter value based on the speed value and the time value; compare the overheating parameter value with a threshold value, wherein the threshold value is representative of undesirable operation for the continuous track; and generate an output signal for the vehicle in accordance with a result of the comparison of the overheating parameter value with the threshold value.

15 Claims, 2 Drawing Sheets

(56) References Cited

U.S. PATENT DOCUMENTS

| | | | |
|---|---|---|---|
| 2006/0025897 A1* | 2/2006 | Shostak | B60C 23/005 |
| | | | 701/1 |
| 2006/0093015 A1* | 5/2006 | Ichihara | B60C 23/0408 |
| | | | 374/45 |
| 2008/0062004 A1* | 3/2008 | Hammerschmidt | B60C 23/0408 |
| | | | 340/870.01 |
| 2012/0228926 A1 | 9/2012 | Bair | |
| 2016/0159173 A1* | 6/2016 | Schneider | B60C 23/0486 |
| | | | 701/70 |

FOREIGN PATENT DOCUMENTS

| | | |
|---|---|---|
| JP | 2010254166 A | 11/2010 |
| WO | 2014022043 A1 | 2/2014 |

\* cited by examiner

CONTROLLER FOR A VEHICLE

This application claims priority to Belgium Application BE2014/0664 filed Sep. 3, 2014, which is incorporated herein by reference in its entirety.

FIELD OF THE INVENTION

The present disclosure relates to controllers for vehicles, in particular, although not exclusively, to controllers for agricultural vehicles with a continuous track for vehicle propulsion.

SUMMARY OF THE INVENTION

Agricultural machines can use rubber tracks for reduced ground compaction. A disadvantage of rubber tracks, when compared with tires, is that one can drive only for a limited time before the belt tends to overheat. This can lead to early failure.

According to a first aspect of the invention, there is provided a controller for a vehicle comprising a continuous track for vehicle propulsion, wherein the controller is configured to:

process (i) a speed value indicative of a speed at which the vehicle is being driven; and (ii) a time value indicative of a period of time for which the vehicle has been driven at that speed;

determine an overheating parameter value based on the speed value and the time value;

compare the overheating parameter value with a threshold value, wherein the threshold value is representative of undesirable operation for the continuous track; and generate an output signal for the vehicle in accordance with a result of the comparison of the overheating parameter value with the threshold value.

The vehicle may be an agricultural vehicle.

The speed value may be indicative of the vehicle being driven at a speed that is greater than a minimum value. The minimum value may be zero, or any other value.

The controller may be further configured to: process an operating mode value indicative of an operating mode of the vehicle; and set/determine the overheating parameter value and/or the threshold value in accordance with the operating mode value before comparing the overheating parameter value with the threshold value.

The controller may be further configured to: process an operating mode value indicative of an operating mode of the vehicle; and (i) if the operating mode value corresponds to a predetermined value, then generate a predefined output signal, such as one that is indicative of there being no warning in relation to overheating of the continuous track;

(ii) only determine the overheating parameter value if the operating mode value is a specific/predetermined value; or (iii) not determine the overheating parameter value or compare the overheating parameter value with the threshold value if the operating mode value is a specific/predetermined value. In this way, an appropriate output signal and/or unnecessary processing overhead can be reduced/avoided if the operating mode value is representative of an operating mode for which overheating is considered unlikely.

The operating mode may be a working mode or a transport/road mode.

The controller may be further configured to: process an ambient temperature value indicative of an ambient temperature associated with the vehicle, which may be representative of the immediate surroundings of the vehicle; and set/determine the overheating parameter value and/or the threshold value in accordance with the ambient temperature value.

The controller may be further configured to: process a machine weight value indicative of a weight of the vehicle; and set/determine the overheating parameter value and/or the threshold value in accordance with the machine weight value.

The machine weight value may be indicative of a make or model of the vehicle, or a type of machine or vehicle. The controller may be configured to look up an expected weight value for the vehicle in a database using the machine weight value; and set/determine the overheating parameter value and/or the threshold value in accordance with the expected weight value.

The controller may be further configured to: process an accessory weight value indicative of a weight of an accessory of the vehicle; and set/determine the overheating parameter value and/or the threshold value in accordance with the accessory weight value. The accessory weight value may be indicative of the presence or absence of a vehicle accessory. The accessory weight value may be indicative of a type of vehicle accessory.

The controller may be configured to: look up an expected accessory weight value for the vehicle accessory in a database using the accessory weight value; and set/determine the overheating parameter value and/or the threshold value in accordance with the expected accessory weight value.

The vehicle may be a combine harvester or a forage harvester. The vehicle accessory may be a header for the combine harvester or forage harvester.

The controller may be configured to: compare the overheating parameter value with a first threshold value; and generate a first output signal for the vehicle if the overheating parameter value is less than the first threshold value. The first output signal may be an output signal indicative of there being no warning in relation to overheating of the continuous track.

The controller may be configured to: compare the overheating parameter value with a second threshold value; and generate a second output signal for the vehicle if the overheating parameter value is greater than the second threshold value. The first threshold value may be the same as the second threshold value. The second output signal may be an output signal indicative of a first type of warning in relation to overheating of the continuous track.

The controller may be configured to: compare the overheating parameter value with a third threshold value; and generate a third output signal for the vehicle if the overheating parameter value is greater than the third threshold value. The third output signal may be an output signal indicative of a second type of warning in relation to overheating of the continuous track.

The controller may be configured to set/determine the overheating parameter value and/or the threshold value by adjusting the overheating parameter value and/or the threshold value, or by keeping the overheating parameter value and/or the threshold value at the same value.

The output signal may be configured to: provide an alert to an operator of the vehicle; and/or automatically control one or more operating parameters of the vehicle. The output signal may be configured to automatically control a ground speed of the vehicle.

There may be provided a vehicle, such as an agricultural vehicle, comprising any controller disclosed herein.

The vehicle may comprise: a speed sensor configured to measure and provide the speed value; a timer configured to measure and provide the time value; and an output component configured to provide an output in accordance with the output signal.

The output component may be an actuator configured to set a parameter of the vehicle or may be a user interface.

The user interface may be a visual user interface such as a display screen, an LED or other light, an audio user interface such as a loudspeaker or a buzzer, or any other user interface that provides an identifiable signal to a user.

According to a further aspect of the invention, there is provided a method of operating a controller for a vehicle comprising a continuous track for vehicle propulsion, the method comprising:

receiving (i) a speed value indicative of a speed at which the vehicle is being driven; and (ii) a time value indicative of a period of time for which the vehicle has been driven at that speed;

determining an overheating parameter value in accordance with the speed value and the time value;

comparing the overheating parameter value with a threshold value, wherein the threshold value is representative of undesirable operation for the continuous track; and generating an output signal for the vehicle in accordance with a result of the comparison of the overheating parameter value with the threshold value.

There may be provided a computer program, which when run on a computer, causes the computer to configure any apparatus, including a controller, a vehicle or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF EMBODIMENT(S)

Misalignment and excessive loading in tracked vehicles causes track belt overheating. This can in turn cause track damage and, eventually, roller damage. Excessive loading can include overloading in terms of the mass carried by the vehicle, and running at an excessive speed (especially on roads). In a heavy vehicle such as a combine harvester, the operational condition can be permanently near or at the limit of safe track overheating performance.

One or more embodiments disclosed herein relate to a controller for a vehicle that has a continuous track for vehicle propulsion, such as a combine harvester or other agricultural machine. The controller can process values representative of at least the speed at which the vehicle is being driven and a time period for which the vehicle has been driven at that speed in order to determine an "overheating parameter value"; that is, a parameter indicative of how likely the continuous track is to overheat. The controller can then compare the overheating parameter value with one or more thresholds in order to generate an output signal, such as an output signal that will cause a warning to be provided to an operator of the vehicle.

Figure 1:
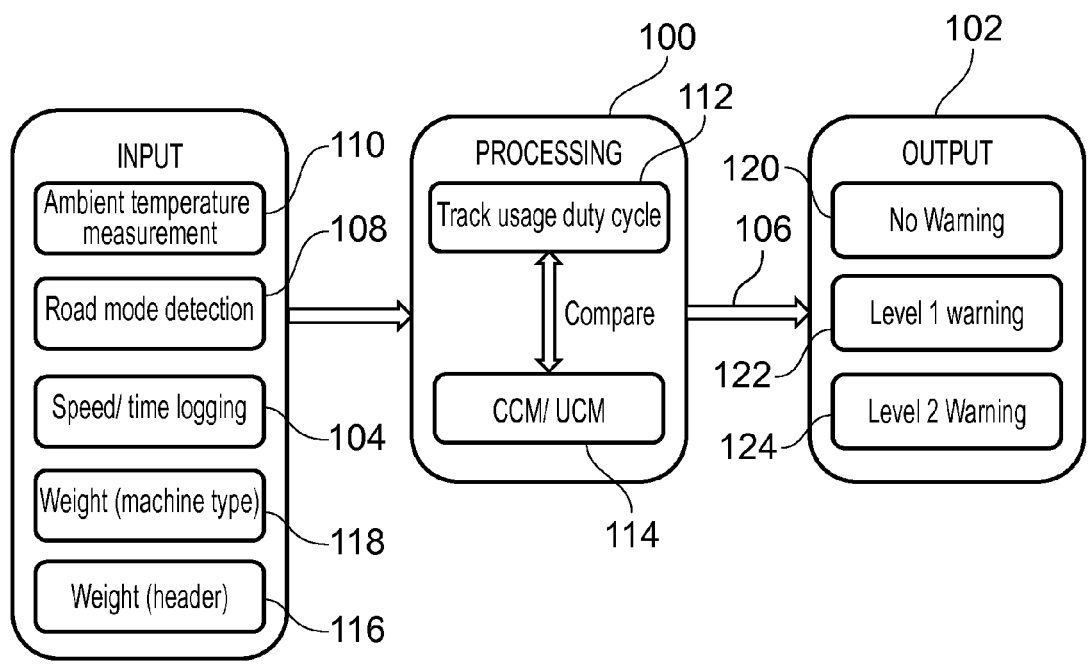
FIG. 1 shows schematically a controller for a vehicle.

FIG. 1 shows schematically a controller 100 for a vehicle (not shown). The controller 100 may be located on-board the vehicle. Specifically, the controller 100 is for a vehicle that has a continuous track for vehicle propulsion. The continuous track can also be referred to as a tank tread or a caterpillar track. Such vehicles are used in the agricultural industry and can include combine harvesters, forage harvesters and tractors.

The controller 100 processes (i) a speed value indicative of a speed at which an associated vehicle is being driven; and (ii) a time value indicative of a period of time for which the vehicle has been driven at that speed. The speed value and time value can be received as an input to the controller 100 in the form of a speed/time log signal, which can be generated by a speed/time logging component 104 associated with the vehicle. Such a log can be populated with information received from a speed sensor for providing the speed value, and a timer for measuring the time value. Alternatively, the speed value and/or time value can be determined by the controller 100 based on received vehicle or timing data.

The controller 100 determines an "overheating parameter value" in accordance with the speed value and the time value. That is, the controller 100 processes the speed value and the time value in order to determine a parameter that represents the likelihood of the continuous track overheating. As will be discussed in more detail below, other inputs can also be used by the controller 100.

The controller can perform a mathematical operation on the speed value and the time value in order to determine a contribution towards the overheating parameter value. For example, if the following log is received from the speed/time logging component 104, or otherwise determined.

| Speed value (km/h) | Time value (minutes) | Product of speed value and time value |
|---|---|---|
| 10 | 15 | 150 |
| 20 | 5 | 100 |
| 0 | 20 | 0 |
| 10 | 5 | 50 |

Then the overheating parameter value can be determined as the sum of the products of the speed value and time value pairs. For the above example, the overheating parameter value would be 300 (which is 150+100++50). It will be appreciated that this numerical example is purely an illustrative example, and that much more sophisticated operations and algorithms can be performed.

Generally speaking, the faster that the vehicle is driven, and the longer the vehicle is driven, the more likely it is that the continuous track will overheat. Such overheating can lead to track damage, early failure of the track, and potentially also roller damage. Also, if the track is made of rubber, overheating can result in undesirable vulcanising of the rubber.

The controller 100 then compares the overheating parameter value with one or more threshold values, wherein the one or more threshold values are representative of undesirable operation for the continuous track, as discussed above. In accordance with a result of the comparison of the overheating parameter value with the threshold value, the controller 100 generates an output signal 106 for the vehicle.

In this example, the output signal 106 is schematically shown as being provided to an output that includes three settings/values: "No Warning" 120, "Level 1 warning" 122 and "Level 2 warning" 124. An appropriate output signal can be generated by comparing the overheating parameter value with 2 or 3 different threshold values, as discussed below.

The controller 100 can perform one or more of the following comparisons:

compare the overheating parameter value with a first threshold value; and, if the overheating parameter value is less than the first threshold value, generate a first output signal. The first output signal may be the "No warning" signal 120.

compare the overheating parameter value with a second threshold value; and, if the overheating parameter value is greater than the second threshold value, generate a second output signal. The second threshold value may the same as the first threshold value. The second output signal may be the "Level 1 warning" signal 122, and may be considered as indicative of a first type of warning.

compare the overheating parameter value with a third threshold value; and, if the overheating parameter value is greater than the third threshold value, generate a third output signal. The third output signal may be the "Level 2 warning" signal 124, and may be considered as indicative of a second type of warning.

The speed value that is processed by the controller 100 may be indicative of the vehicle being driven at a speed that is greater than a minimum value. The minimum value may be zero such that the corresponding time value represents the period of time that the vehicle has been non-stationary. The time value may represent the cumulative amount of time that the vehicle has been driven at that speed (for example non-stationary) in a preceding time window of predetermined duration. For example, the time value may represent the amount of time that the vehicle has been driven at a certain speed in the last hour. In some examples, the controller 100, or another processor/component associated with the controller 100, can perform an averaging operation on the speed data acquired over a period of time, optionally including periods of time for which the vehicle is stationary.

Optionally, the speed value may be indicative of the vehicle being driven at a speed that is within a range of values. That is, a speed that is greater than a minimum value and also less than a maximum value such that the speed value represents a range of values. There may be a plurality of such ranges that relate to different values.

The vehicle may include an output component such as a user interface 102 configured to provide an output in accordance with the output signal. The user interface 102 may be a visual user interface such as a display screen, an LED or other light; an audio user interface such as a loudspeaker or a buzzer; or any other user interface that provides an identifiable signal to a user.

In this way, a monitoring system can be provided that warns the driver about overheating depending on the actual conditions of use of the machine. This can be considered better than an operator having to rely on a maximum transport time that is written in the operator's manual. A warning on a user's monitor can be considered as an advancement compared to just text in the manual, which few people may read. A typical time limit can be 45 minutes. In the case of combine harvesters it additionally can be a requirement to remove the header bar, in order to reduce the mass supported through the tracks.

Presently vehicle manufacturers address these problems simply by including a written warning in the operator manual to the effect that on-road driving must be limited as to time.

In addition to processing the speed value and the time value as discussed above, the controller 100 can process one or more additional values and set the overheating parameter value and/or the threshold value in accordance with the additional values. The one or more additional values may be received from a component that is separate to the controller 100. Alternatively, the one or more additional values can be determined by the controller 100 based on received vehicle data and communicated internally within the controller 100. Since the controller 100 will go on to compare the overheating parameter value with the threshold value, it will be appreciated that it does not matter which of these parameters is set in accordance with the additional values because the same result can be achieved either way. In some examples, the controller 100 can adjust the overheating parameter value (and/) or the threshold value, for example by applying a weighting to one or more values. This weighting value may be 1 such that the value is not adjusted for certain additional values. In other examples, the controller 100 may apply an offset in accordance with the additional value.

Example additional values include an operating mode value, an ambient temperature value, a machine weight value, and an accessory weight value, which will be discussed in more detail below.

The controller 100 can process an operating mode value indicative of an operating mode of the vehicle. The operating mode may be a working mode or a transport/road mode. The operating mode value may be received from a gear stick or other controller in the vehicle that is used by an operator to control the vehicle. Alternatively, the operating mode value may be received from a road mode detector 108.

The controller 100 may only go on to determine the overheating parameter value if the operating mode value is a specific value. For example, if the operating mode value is a working mode, then the controller 100 may not calculate the overheating parameter value or output signal because it may be programmed based on an assumption that if the vehicle is working (for example in a relatively soft field) then the continuous track is unlikely to overheat.

The controller 100 can process an ambient temperature value/measurement indicative of an ambient temperature associated with the vehicle, for example an ambient temperature associated with the immediate surroundings of the vehicle. The ambient temperature value may be received from a temperature sensor 110.

The controller 100 can process an accessory weight value indicative of a weight of an accessory of the vehicle. The accessory weight value may be indicative of the presence or absence of a vehicle accessory. Alternatively, or additionally, the accessory weight value may be indicative of a type of vehicle accessory. The accessory weight value may be already accessible to the controller 100 because it may be used for other functions of the vehicle, or it can be received from a weight (header/accessory) input device 116 (such as a user input device). The controller can look up an expected accessory weight value for the vehicle accessory in a database using the received accessory weight value. For agricultural vehicles, the accessory may be a header (such as for a combine harvester or a forage harvester) or other heavy mass that can significantly affect the rate at which the continuous track will heat up.

The controller 100 may process a machine weight value indicative of a weight of the vehicle. The machine weight value may be indicative of a make or model of the vehicle, or the type of machine or vehicle. The machine weight value may be already accessible to the controller 100 because it may be used for other functions of the vehicle, or it can be received from a weight (machine type) input device 118 (such as a user input device). The controller 100 can look up an expected weight value for the vehicle in a database using the received information representative of the make or model of the vehicle/type of machine or vehicle.

As discussed above, the output signal 106 can be suitable for providing an alert to an operator of the vehicle. Alternatively, or additionally, the controller 100 can automatically control one or more operating parameters of the vehicle. For example, the controller 100 can automatically reduce or limit the ground speed of the vehicle on the basis that this should reduce the temperature of the tracks. In which case, the output component that receives the output signal may be an actuator configured to set a parameter of the vehicle.

The controller 100 of FIG. 1 is schematically shown as including a first block 112 and a second block 114 in this example. The first block 112 controls the track system. The second block 114 (CCM/UCM module) is the current control unit of the vehicle. The first block 112 can be a software program integrated in the second block 114. The controller 100 may compare information from the first block 112 with information from the second block 114.

Figure 2:
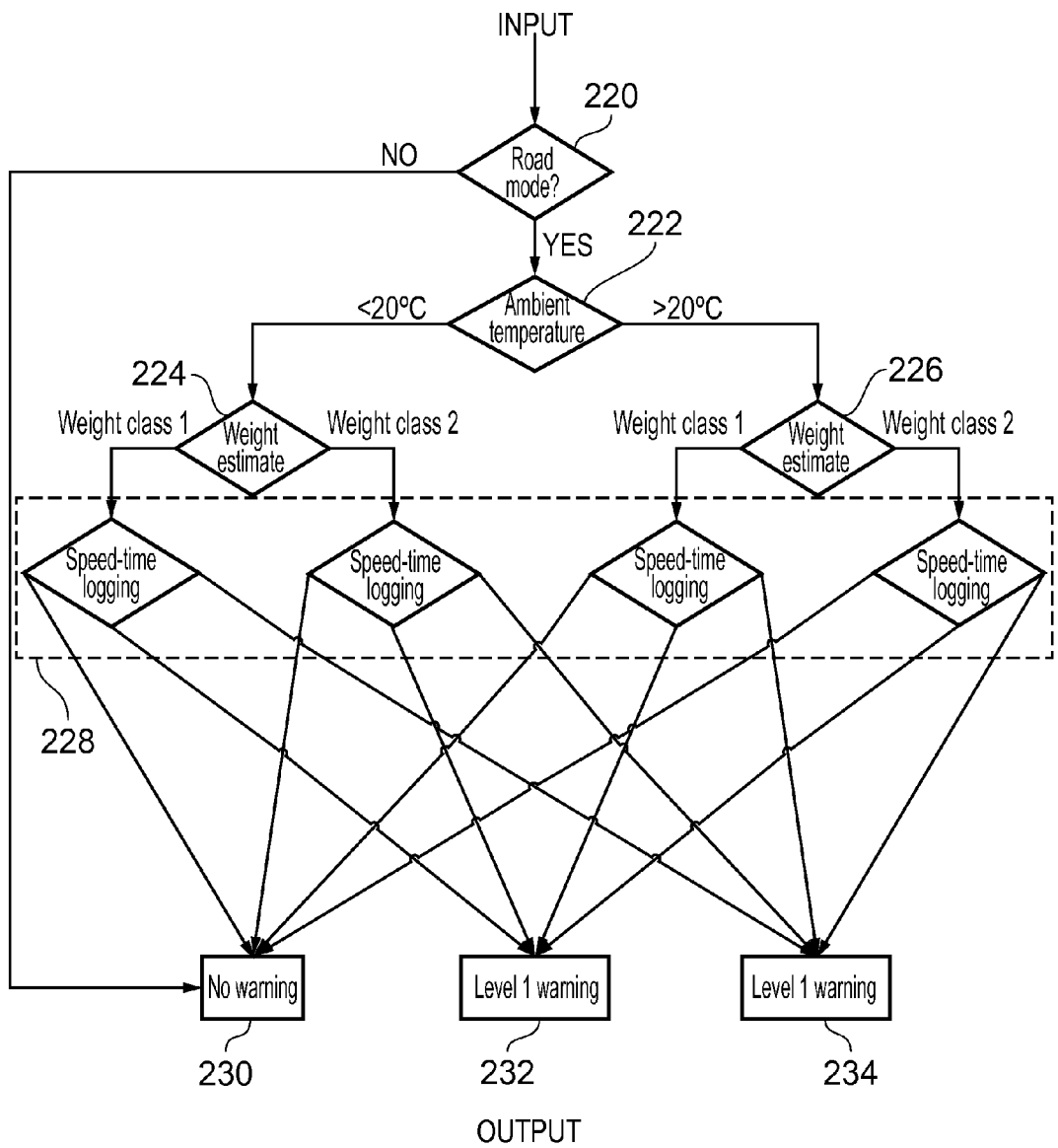
FIG. 2 shows schematically a process flow.

FIG. 2 shows schematically a process flow that processes the various inputs that are shown in FIG. 1 (road mode, ambient temperature, weight estimate and speed/time log), and generates an output signal with one of three values ("No Warning", "Level 1 warning" and "Level 2 warning").

FIG. 2 shows how, in this example, the road mode value is first checked at step 220. If the road mode value is not representative of the vehicle being operated in a road mode (when overheating of the continuous tracks is considered most likely), then the method moves to step 230 and generates a "No Warning" output signal. In this way, a predefined output signal is generated if the road mode value corresponds to a predetermined value. If the road mode value is representative of the vehicle being operated in a road mode, then the method moves to step 222.

The ambient temperature value is checked at step 222. If the ambient temperature value is less than a temperature threshold value (200C in this example), then the process moves on to a first weight comparison step 224. If the ambient temperature value is greater than the temperature threshold value, then the process moves on to a second weight comparison step 226. As will be appreciated from the description that follows, application of the different weight comparison steps can result in different output signals being generated.

At each of the first weight comparison step 224 and the second weight comparison step 226, one or both of the machine weight value and the accessory weight value can be used to determine a weight class for the vehicle. Two different weight classes are shown in FIG. 2, although it will be appreciated that any number of weight classes can be used. Depending upon the determined weight class for each of the first weight comparison step 224 and the second weight comparison step 226, the process moves on to one of four different speed-time processing steps 228.

In each of the four speed-time processing steps 228 the speed/time log input data is processed to determine which type of warning output signal to generate. The method moves on to one of the following steps depending upon the result of the speed-time processing at step 228:

step 230 in order to generate a "No Warning" output signal;
step 232 in order to generate a "Level 1 warning" output signal; or
step 234 in order to generate a "Level 2 warning" output signal.

Depending on the previously determined weight of the machine and ambient temperature, use of the plurality of speed-time processing steps 228 enables the method to use different speed/time tables. These different tables can be categorized according to the weight class such that for higher weights, lower speed/time values will be allowed before warning output signals are generated at steps 232 or 234. In some examples, each of the inputs can be processed differently in each of the different speed-time processing steps 228 before they are compared with fixed thresholds. In other examples, each of the inputs are processed in the same way, but they are compared with different threshold values that are specific to the individual speed-time processing step 228.

Examples disclosed in this document can sense various parameters such as the presence or absence of a header bar or perhaps another removable heavy mass; and the driving history of the vehicle in terms of speeds attained during a sensing interval, and then calculate with better accuracy when, based on the actual conditions experienced by the track, overheating is likely. This can be a software-based solution that can give rise to, for example, a warning alert on the operator's display.

One or more of the examples disclosed herein can be considered as software programs that can warn the driver of a vehicle about overheating of a rubber track belt. A software program could display a message on a monitor of the machine/vehicle that warns the driver when his tracks can start overheating. Furthermore, one could log the driving time for review in case of warranty issues with the track belts. In addition, the software can make a difference depending on the machine weight, driving time and track system installed allowing for more accurate timing of the warning. It can even take ambient temperature into consideration.

The invention claimed is:

1. A controller system for a vehicle comprising a continuous track for propulsion, comprising
a controller configured to:
process (i) a speed value indicative of a speed at which the vehicle is operated; and (ii) a time value indicative of a period of time the vehicle is operated at that speed;
determine an overheating parameter value representative of a likelihood of overheating of the continuous track determined from a mathematical operation using the speed value and the time value;
compare the overheating parameter value with a threshold value, wherein the threshold value is representative of undesirable operation for the continuous track; and
generate an output signal to at least one of a user interface and actuator in accordance with a result of the comparison of the overheating parameter value with the threshold value.

2. The controller system of claim 1, wherein the speed value is indicative of the vehicle traveling at a speed greater than a minimum value.

3. The controller system of claim 1, wherein the controller is further configured to:
process an operating mode value indicative of an operating mode of the vehicle; and
set the overheating parameter value or the threshold value in accordance with the operating mode value before comparing the overheating parameter value with the threshold value.

4. The controller system of claim 1, wherein the controller is further configured to:
process an operating mode value indicative of an operating mode of the vehicle; and
if the operating mode value corresponds to a predetermined value, then generate an output signal that is indicative of there being no warning in relation to overheating of the continuous track.

5. The controller system of claim 4, wherein the controller is further configured to:
process an ambient temperature value indicative of an ambient temperature associated with the immediate surroundings of the vehicle; and
set at least one of the overheating parameter value and the threshold value in accordance with the ambient temperature value.

6. The controller system of claim 4, wherein the controller is further configured to:
process a machine weight value indicative of a weight of the vehicle; and
set at least one of the overheating parameter value and the threshold value in accordance with the machine weight value.

7. The controller system of claim 4, wherein the controller is further configured to:
process an accessory weight value indicative of a weight of an accessory of the vehicle; and
set the overheating parameter value and the threshold value in accordance with the accessory weight value.

8. The controller system claim 1, wherein the controller is further configured to:
compare the overheating parameter value with a first threshold value; and
generate a first output signal for the vehicle if the overheating parameter value is less than the first threshold value, wherein the first output signal is an output signal indicative of there being no warning in relation to overheating of the continuous track.

9. The controller system of claim 8, configured to:
compare the overheating parameter value with a second threshold value; and
generate a second output signal for the vehicle if the overheating parameter value is greater than the second threshold value, wherein the second output signal is an output signal indicative of a first type of warning in relation to overheating of the continuous track.

10. The controller system of claim 3, configured to set the overheating parameter value and or the threshold value by adjusting the overheating parameter value or the threshold value.

11. The controller system of claim 1, wherein the output signal is configured to:
provide an alert to an operator of the vehicle; or
automatically control one or more operating parameters of the vehicle.

12. The controller system of claim 11, wherein the output signal is configured to automatically control a ground speed of the vehicle.

13. The controller system of claim 1, in combination with an agricultural vehicle wherein the controller is connected to at least a vehicle propulsion system of the vehicle.

14. A method of operating a controller for a vehicle comprising a continuous track for vehicle propulsion, the method comprising:
receiving with the controller (i) a speed value indicative of a speed at which the vehicle is driven; and (ii) a time value indicative of a period of time for which the vehicle is driven at that speed;
determining with the controller an overheating parameter value representative of a likelihood of overheating of the continuous track determined from a mathematical operation using the speed value and the time value;
comparing with the controller the overheating parameter value with a threshold value, wherein the threshold value is representative of undesirable operation for the continuous track; and
generating with the controller an output signal to at least one of a user interface and actuator in accordance with a result of the comparison of the overheating parameter value with the threshold value.

15. The method of claim 14, wherein the controller is programmed with a computer program to perform the steps.

* * * * *